United States Patent
Breault et al.

(10) Patent No.: US 12,404,812 B1
(45) Date of Patent: Sep. 2, 2025

(54) OPEN ROTOR AIRCRAFT PROPULSION SYSTEM WITH BYPASS FLOWPATH

(71) Applicant: RTX Corporation, Farmington, CT (US)

(72) Inventors: Andrew E. Breault, Bolton, CT (US); Jeffrey T. Morton, Manchester, CT (US); Jon E. Sobanski, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/594,936

(22) Filed: Mar. 4, 2024

(51) Int. Cl.
| | |
|---|---|
| *F02C 7/36* | (2006.01) |
| *B64D 35/00* | (2006.01) |
| *F02C 9/18* | (2006.01) |

(52) U.S. Cl.
CPC .............. *F02C 7/36* (2013.01); *B64D 35/00* (2013.01); *F02C 9/18* (2013.01); *F05D 2220/323* (2013.01); *F05D 2260/40311* (2013.01)

(58) Field of Classification Search
CPC ........ F02C 7/36; F02C 9/18; F05D 2220/323; F05D 2260/40311
See application file for complete search history.

(56) References Cited

U.S. PATENT DOCUMENTS

| | | | |
|---|---|---|---|
| 4,446,696 A * | 5/1984 | Sargisson | F02K 3/077 60/226.3 |
| 4,765,135 A | 8/1988 | Lardellier | |
| 4,936,748 A | 6/1990 | Adamson | |
| 9,869,248 B2 | 1/2018 | Suciu | |
| 10,202,941 B2 | 2/2019 | Suciu | |
| 11,834,954 B2 | 12/2023 | Ostdiek | |
| 2005/0026745 A1* | 2/2005 | Mitrovic | F16H 1/2836 475/348 |
| 2013/0259654 A1* | 10/2013 | Kupratis | F02K 3/06 415/122.1 |
| 2014/0290265 A1* | 10/2014 | Ullyott | F02C 3/113 60/773 |
| 2015/0233302 A1* | 8/2015 | Levasseur | F02C 7/32 60/726 |
| 2016/0138477 A1* | 5/2016 | Otto | F02K 3/06 415/122.1 |
| 2016/0363055 A1* | 12/2016 | Edwards | F02C 7/36 |

(Continued)

FOREIGN PATENT DOCUMENTS

DE 102015209148 A1 10/2016

*Primary Examiner* — David P. Olynick
(74) *Attorney, Agent, or Firm* — Getz Balich LLC

(57) ABSTRACT

A propulsion system for an aircraft includes an open propulsor rotor and a turbine engine. The turbine engine includes a fan section, an engine core, a first geartrain, a core flowpath and a bypass flowpath. The fan section includes a fan rotor. The engine core includes a first rotating assembly, a low pressure compressor section, a high pressure compressor section, a combustor section, a high pressure turbine section and a low pressure turbine section. The first rotating assembly drives rotation of the open propulsor rotor and the fan rotor through the first geartrain. The core flowpath extends through the low pressure compressor section, the high pressure compressor section, the combustor section, the high pressure turbine section and the low pressure turbine section. The bypass flowpath extends outside of and along the engine core.

17 Claims, 7 Drawing Sheets

(56) References Cited

U.S. PATENT DOCUMENTS

| | | |
|---|---|---|
| 2021/0108597 A1 | 4/2021 | Marion |
| 2021/0231058 A1 | 7/2021 | Plante |
| 2022/0074349 A1 | 3/2022 | Valois |
| 2023/0085244 A1 | 3/2023 | Miller |

* cited by examiner

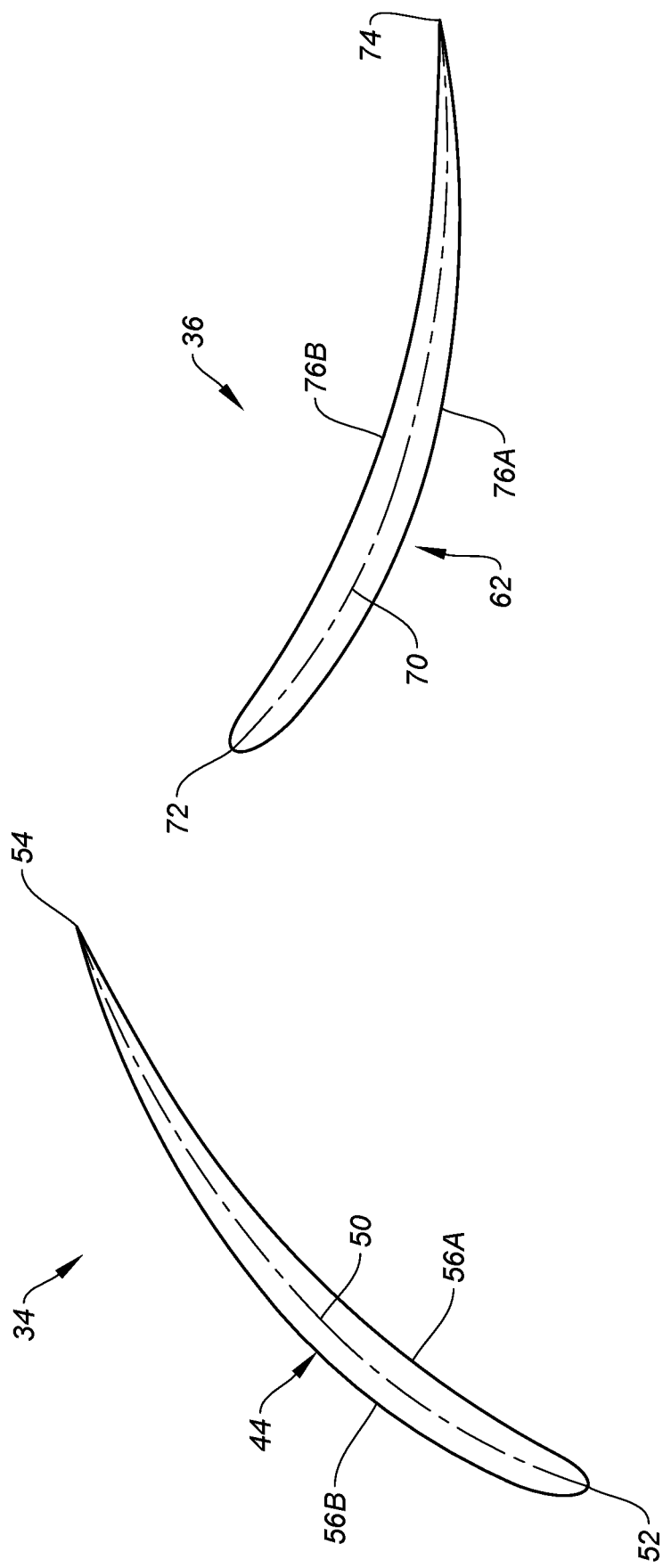

OPEN ROTOR AIRCRAFT PROPULSION SYSTEM WITH BYPASS FLOWPATH

BACKGROUND OF THE DISCLOSURE

1. Technical Field

This disclosure relates generally to an aircraft and, more particularly, to a propulsion system for the aircraft.

2. Background Information

Various types and configurations of aircraft propulsion systems are known in the art including those with one or more open propulsor rotors. While these known aircraft propulsion systems have various benefits, there is still room in the art for improvement.

SUMMARY OF THE DISCLOSURE

According to an aspect of the present disclosure, a propulsion system is provided for an aircraft. This propulsion system includes an open propulsor rotor and a turbine engine. The turbine engine includes a fan section, an engine core, a first geartrain, a core flowpath and a bypass flowpath. The fan section includes a fan rotor. The engine core includes a first rotating assembly, a low pressure compressor section, a high pressure compressor section, a combustor section, a high pressure turbine section and a low pressure turbine section. The first rotating assembly is rotatable about an axis and configured to drive rotation of the open propulsor rotor and the fan rotor through the first geartrain. The first geartrain is located axially between the engine core and the open propulsor rotor. The core flowpath extends through the low pressure compressor section, the high pressure compressor section, the combustor section, the high pressure turbine section and the low pressure turbine section from an inlet into the core flowpath to an exhaust from the core flowpath. The inlet into the core flowpath is next to and downstream of the fan section. The bypass flowpath extends outside of and along the engine core from an inlet into the bypass flowpath to an exhaust from the bypass flowpath. The inlet into the bypass flowpath is next to and downstream of the fan section.

According to another aspect of the present disclosure, another propulsion system is provided for an aircraft. This propulsion system includes a first gear system, a second gear system, an intermediate shaft, a fan rotor, an open propulsor rotor and a rotating assembly of a turbine engine. The first gear system includes a first sun gear, a first ring gear, a plurality of first intermediate gears and a first carrier. Each of the first intermediate gears is meshed with and radially between the first sun gear and the first ring gear. Each of the first intermediate gears is rotatably mounted to the first carrier. The second gear system includes a second sun gear, a second ring gear, a plurality of second intermediate gears and a second carrier. Each of the second intermediate gears is meshed with and radially between the second sun gear and the second ring gear. Each of the second intermediate gears is rotatably mounted to the second carrier. The intermediate shaft is coupled to the first ring gear and the second sun gear. The fan rotor is coupled to the intermediate shaft. The open propulsor rotor is coupled to the second carrier. The rotating assembly is coupled to the first sun gear. The rotating assembly is configured to drive rotation of the fan rotor through the first gear system and is independent of the second gear system. The rotating assembly is configured to drive rotation of the open propulsor rotor through the first gear system and the second gear system.

According to still another aspect of the present disclosure, another propulsion system is provided for an aircraft. This propulsion system includes a plurality of gear systems, an intermediate shaft, a fan rotor, an open propulsor rotor and a rotating assembly of a turbine engine. Each of the gear systems includes a planetary gear system or a star gear system. The intermediate shaft operatively couples a first of the gear systems to a second of the gear systems. The fan rotor is coupled to the intermediate shaft. The open propulsor rotor is operatively coupled to the second of the gear systems. The rotating assembly is operatively coupled to the first of the gear systems. The rotating assembly is configured to drive rotation of the fan rotor through the first of the gear systems and is independent of the second of the gear systems. The rotating assembly is configured to drive rotation of the open propulsor rotor through the first of the gear systems and the second of the gear systems.

The propulsion system may also include an engine core which includes the rotating assembly. The first gear system may be arranged between the engine core and the fan rotor.

The low pressure compressor section may be located axially between the first geartrain and the high pressure compressor section along the axis.

The first rotating assembly may be a low pressure turbine rotor in the low pressure turbine section.

The engine core may also include an intermediate pressure turbine section between the high pressure turbine section and the low pressure turbine section along the core flowpath.

The low pressure turbine section may include a low pressure turbine rotor. The first geartrain may be located axially between the low pressure turbine rotor and the fan rotor.

The low pressure turbine rotor may be configured to rotate independent of the first rotating assembly.

The propulsion system may also include a second geartrain. The first rotating assembly may be configured to drive the rotation of the fan rotor through the first geartrain and independent of the second geartrain. The first rotating assembly may be configured to drive the rotation of the open propulsor rotor through the first geartrain and the second geartrain.

One of the first geartrain and the second geartrain may be configured as or otherwise include a planetary gear system. The other one of the first geartrain and the second geartrain may be configured as or otherwise include a star gear system.

The first geartrain may be configured as or otherwise include a planetary gear system. The second geartrain may be configured as or otherwise include a planetary gear system.

The first geartrain may be configured as or otherwise include a star gear system. The second geartrain may be configured as or otherwise include a star gear system.

The second geartrain may be located axially between the fan rotor and the open propulsor rotor.

The fan rotor may be located axially between the first geartrain and the second geartrain.

At least a portion of the bypass flowpath may be annular.

The propulsion system may also include a heat exchanger disposed in the bypass flowpath.

The turbine engine may also include an exhaust flowpath fluidly coupling the core flowpath and the bypass flowpath to an exhaust from the turbine engine.

The propulsion system may also include an open guide vane structure downstream of the open propulsor rotor. The open guide vane structure may be configured to condition air propelled by the open propulsor rotor.

The propulsion system may also include a second open propulsor rotor. The first rotating assembly may also be configured to drive rotation of the second open propulsor rotor through the first geartrain.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 2 is a cross-sectional illustration of an open propulsor blade.

FIG. 3 is a cross-sectional illustration of an open guide vane.

DETAILED DESCRIPTION

Figure 1:
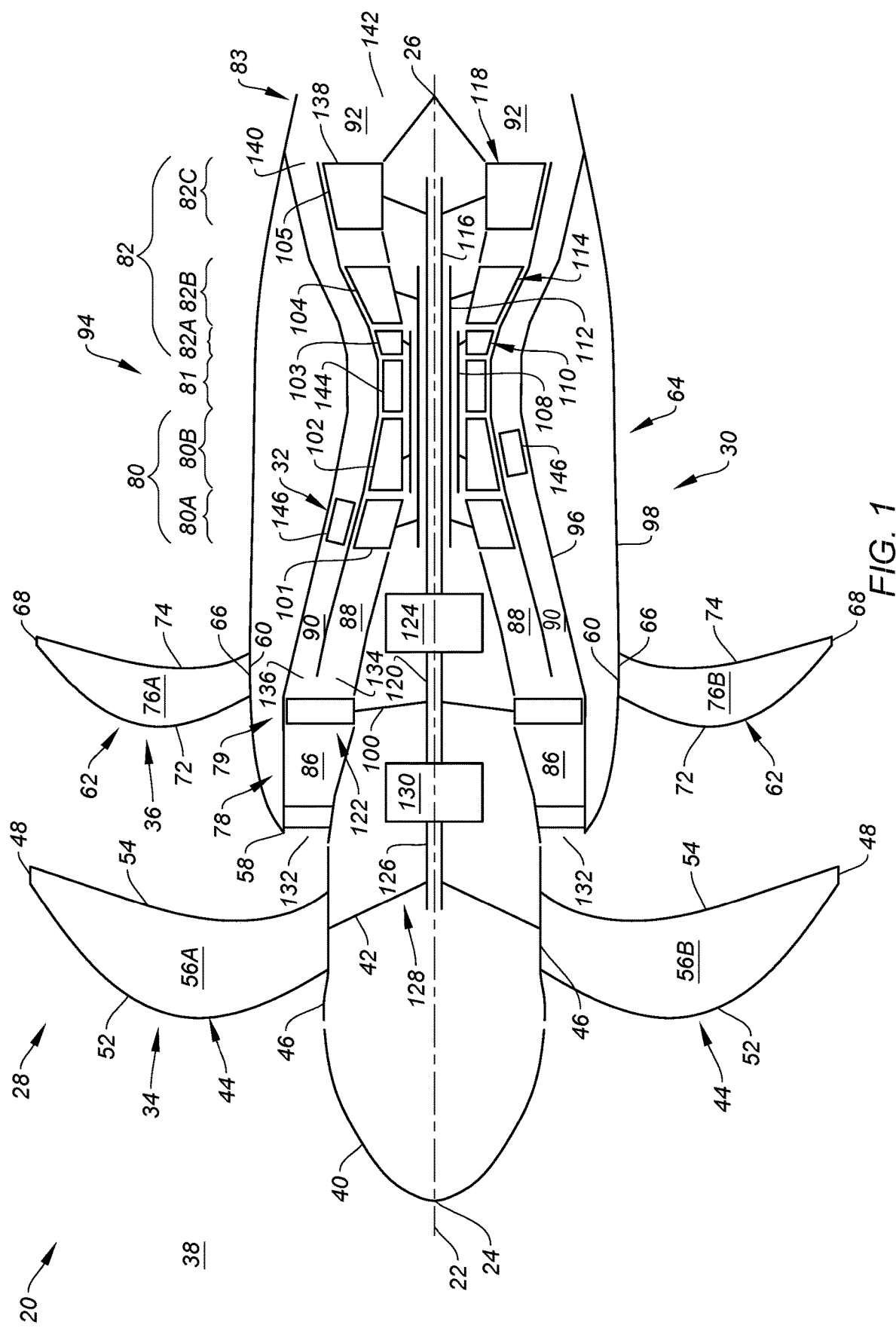
FIG. 1 is a sectional schematic illustration of a propulsion system for an aircraft.

FIG. 1 illustrates a propulsion system 20 for an aircraft. The aircraft may be an airplane, a drone (e.g., an unmanned aerial vehicle (UAV)) or any other manned or unmanned aerial vehicle or system. The aircraft propulsion system 20 is configured as an open rotor propulsion system. The aircraft propulsion system 20 of FIG. 1, for example, extends axially along an axis 22 between an upstream, forward end 24 of the aircraft propulsion system 20 and a downstream, aft end 26 of the aircraft propulsion system 20. The axis 22 may be a centerline axis of the aircraft propulsion system 20 and/or one or more of its members. The axis 22 may also or alternatively be a rotational axis of one or more members of the aircraft propulsion system 20. The aircraft propulsion system 20 of FIG. 1 includes a propulsion module 28, a turbine engine 30 and a heat exchange system 32.

The propulsion module 28 of FIG. 1 includes an open propulsor rotor 34 and an open guide vane structure 36. Here, the term "open" may describe a propulsion system section and/or a propulsion system component which is open to an environment 38 (e.g., an ambient environment) external to the aircraft propulsion system 20 and its propulsion module 28 and, more generally, external to the aircraft. The propulsion module members 34 and 36 of FIG. 1, for example, are un-ducted and unshrouded components of the aircraft propulsion system 20 and its propulsion module 28. The propulsion module 28 of FIG. 1 also includes a nose cone 40 disposed at (e.g., on, adjacent or proximate) the propulsion system forward end 24. This nose cone 40 may be configured as a spinner which is rotatable with the propulsor rotor 34 about the axis 22. Alternatively, the nose cone 40 may be configured as a stationary structure of the propulsion module 28.

The propulsor rotor 34 includes a rotor base 42 (e.g., a disk or a hub) and a plurality of open propulsor blades 44 (e.g., airfoils). The propulsor blades 44 are arranged circumferentially around the rotor base 42 and the axis 22 in an array; e.g., a circular array. Each of the propulsor blades 44 is connected to (e.g., formed integral with or otherwise attached to) the rotor base 42.

Each propulsor blade 44 projects spanwise along a span line of the respective propulsor blade 44 (e.g., radially relative to the axis 22) out from an exterior surface 46 of the rotor base 42, into the external environment 38, to an unshrouded, distal tip 48 of the respective propulsor blade 44. Each propulsor blade 44 is thereby configured as an un-ducted and unshrouded propulsor blade which is exposed to (e.g., disposed in) the surrounding external environment 38. Referring to FIG. 2, each propulsor blade 44 extends longitudinally along a mean line 50 (e.g., a camber line) of the respective propulsor blade 44 from a leading edge 52 of the respective propulsor blade 44 to a trailing edge 54 of the respective propulsor blade 44. Each propulsor blade 44 extends laterally between and to opposing side exterior surfaces 56A and 56B (generally referred to as "56") of the respective propulsor blade 44. The first blade exterior surface 56A may be a concave, pressure side surface of the respective propulsor blade 44. The second blade exterior surface 56B may be a convex, suction side surface of the respective propulsor blade 44. Each of these blade exterior surfaces 56 extends longitudinally along the blade mean line 50 between (and meets at) the respective blade leading edge 52 and the respective blade trailing edge 54. Referring to FIG. 1, each blade element 52, 54, 56A, 56B extends spanwise from the base exterior surface 46 to the respective blade tip 48.

Each propulsor blade 44 may be configured as a fixed propulsor blade. Each propulsor blade 44, for example, may be fixedly connected to the rotor base 42. Alternatively, some or all of the propulsor blades 44 may each be configured as a variable propulsor blade. Each propulsor blade 44, for example, may be pivotally coupled to the rotor base 42 so as to be operable to change, for example, a pitch of the respective propulsor blade 44.

The propulsor rotor 34 of FIG. 1 is arranged axially along the axis 22 between the nose cone 40 and the guide vane structure 36. The propulsor rotor 34 of FIG. 1, in particular, is arranged axially downstream, aft of the nose cone 40 and axially upstream, forward of the turbine engine 30. An upstream, forward end of the propulsor rotor 34 may be disposed axially next to (e.g., adjacent, slightly spaced from) a downstream, aft end of the nose cone 40. A downstream, aft end of the propulsor rotor 34 may be disposed axially next to an upstream, forward end 58 of the turbine engine 30.

The guide vane structure 36 includes an inner platform 60 and a plurality of open guide vanes 62; e.g., airfoils. The inner platform 60 may be configured as part of (or connected to) a housing 64 of the turbine engine 30, or another external stationary structure of the aircraft propulsion system 20. The guide vanes 62 are arranged circumferentially around the inner platform 60 and the axis 22 in an array; e.g., a circular array. Each of the guide vanes 62 is connected to the inner platform 60.

Each guide vane 62 projects spanwise along a span line of the respective guide vane 62 (e.g., radially relative to the axis 22) out from an exterior surface 66 of the inner platform 60, into the external environment 38, to an unshrouded, distal tip 68 of the respective guide vane 62. Each guide vane 62 is thereby configured as an un-ducted and unshrouded guide vane which is exposed to (e.g., disposed in) the surrounding external environment 38. Referring to FIG. 3, each guide vane 62 extends longitudinally along a mean line 70 (e.g., a camber line) of the respective guide vane 62 from a leading edge 72 of the respective guide vane 62 to a trailing edge 74 of the respective guide vane 62. Each guide vane 62 extends laterally between and to opposing side exterior surfaces 76A and 76B (generally referred to as "76") of the respective guide vane 62. The first vane exterior surface 76A may be a convex, suction side surface of the respective guide vane 62. The second vane exterior surface 76B may be a concave, pressure side surface of the respective guide vane 62. Each of these vane exterior surfaces 76 extends longitudinally along the vane mean line 70 between (and meets at) the respective vane leading edge 72 and the respective vane trailing edge 74. Referring to FIG. 1, each vane element 72, 74, 76A, 76B extends spanwise from the platform exterior surface 66 to the respective vane tip 68.

Each guide vane 62 may be configured as a fixed guide vane. Each guide vane 62, for example, may be fixedly connected to the inner platform 60 and/or an internal support structure covered by the inner platform 60. Alternatively, some or all of the guide vanes 62 may each be configured as a variable guide vane. Each guide vane 62, for example, may be pivotally and/or otherwise moveably coupled to the inner platform 60 and/or the internal support structure covered by the inner platform 60 so as to be operable to change, for example, a pitch of the respective guide vane 62.

The guide vane structure 36 of FIG. 1 is disposed radially outboard of the turbine engine 30 and its engine housing 64. This guide vane structure 36 is arranged axially aft and downstream of the forward end 58 of the turbine engine 30 and its engine housing 64. The guide vane structure 36 of FIG. 1 thereby axially overlaps and circumscribes the turbine engine 30 and its engine housing 64.

The turbine engine 30 of FIG. 1 includes an inlet section 78, a fan section 79, a compressor section 80, a combustor section 81, a turbine section 82 and an exhaust section 83. This turbine engine 30 also includes an (e.g., annular) inlet flowpath 86, a (e.g., annular) core flowpath 88, a (e.g., annular) bypass flowpath 90 and an exhaust flowpath 92.

The compressor section 80 of FIG. 1 includes a low pressure compressor (LPC) section 80A and a high pressure compressor (HPC) section 80B. The turbine section 82 of FIG. 1 includes a high pressure turbine (HPT) section 82A, an intermediate pressure turbine (IPT) section 82B and a power turbine (PT) section 82C, which PT section 82C is a low pressure turbine (LPT) section of the aircraft propulsion system 20 and its turbine engine 30. At least (or only) the LPC section 80A, the HPC section 80B, the combustor section 81, the HPT section 82A, the IPT section 82B and the PT section 82C may collectively form a core 94 of the turbine engine 30; e.g., a gas generator.

The engine sections 78, 79, 80A, 80B, 81, 82A, 82B, 82C and 83 may be arranged sequentially along the axis 22 between the propulsion system forward end 24 and the propulsion system aft end 26. With this arrangement, each engine section 80A, 80B of FIG. 1 is arranged axially along the axis 22 between (A) the propulsion module 28 and its members 34 and 36 and (B) the combustor section 81. The fan section 79 of FIG. 1 is also arranged axially along the axis 22 between (A) the propulsor rotor 34 and (B) the engine core 94 and its engine sections 80A-82C. The inlet section 78 of FIG. 1 is arranged at the engine forward end 58. The exhaust section 83 of FIG. 1 is arranged at the propulsion system aft end 26. The engine sections 79-82C of FIG. 1 are arranged within the engine housing 64, which may include an engine case 96 and a nacelle 98 over the engine case 96. The propulsor rotor 34 and the guide vane structure 36 are arranged outside of the engine housing 64.

Each of the engine sections 79, 80A, 80B, 82A, 82B, 82C includes a respective bladed rotor 100-105; e.g., a ducted and/or shrouded engine rotor. Each of these bladed rotors 100-105 includes a rotor base (e.g., a disk or a hub) and a plurality of rotor blades (e.g., airfoils, vanes, etc.). The rotor blades are arranged circumferentially around the respective rotor base and the axis 22 in an array. The rotor blades may also be arranged into one or more stages longitudinally along the flowpath 86, 88. Each of the rotor blades is connected to the respective rotor base. Each of the rotor blades projects radially (e.g., spanwise) out from the respective rotor base into the flowpath 86, 88 and to a distal tip of the respective rotor blade.

The HPC rotor 102 is coupled to and rotatable with the HPT rotor 103. The HPC rotor 102 of FIG. 1, for example, is connected to the HPT rotor 103 by a high speed shaft 108. At least (or only) the HPC rotor 102, the HPT rotor 103 and the high speed shaft 108 collectively form a high speed rotating assembly 110; e.g., a high speed spool of the turbine engine 30 and its engine core 94. This high speed rotating assembly 110 is rotatable about the axis 22. However, in other embodiments, the high speed rotating assembly 110 may be rotatable about another axis laterally and/or angularly offset from the axis 22.

The LPC rotor 101 is coupled to and rotatable with the IPT rotor 104. The LPC rotor 101 of FIG. 1, for example, is connected to the IPT rotor 104 by a low speed shaft 112. At least (or only) the LPC rotor 101, the IPT rotor 104 and the low speed shaft 112 collectively form a low speed rotating assembly 114; e.g., a low speed spool of the turbine engine 30 and its engine core 94. This low speed rotating assembly 114 is rotatable about the axis 22. However, in other embodiments, the low speed rotating assembly 114 may be rotatable about another axis laterally and/or angularly offset from the axis 22.

The PT rotor 105 (e.g., the LPT rotor) is connected to and rotatable with a power turbine shaft 116. At least (or only) the PT rotor 105 and the power turbine shaft 116 collectively form a power turbine rotating assembly 118. This power turbine rotating assembly 118 is rotatable about the axis 22. However, in other embodiments, the power turbine rotating assembly 118 may be rotatable about another axis laterally and/or angularly offset from the axis 22.

The fan rotor 100 is connected to and rotatable with a fan shaft 120. At least (or only) the fan rotor 100 and the fan shaft 120 collectively form a fan rotating assembly 122. This fan rotating assembly 122 is rotatable about the axis 22. However, in other embodiments, the fan rotating assembly 122 may be rotatable about another axis laterally and/or angularly offset from the axis 22.

The fan rotating assembly 122 is coupled to the power turbine rotating assembly 118 through a first geartrain 124; e.g., a transmission, a speed change device, an epicyclic geartrain, etc. This first geartrain 124 is disposed axially between and operatively couples the fan rotating assembly 122 and its fan shaft 120 to the power turbine rotating assembly 118 and its power turbine shaft 116. With the foregoing arrangement, the fan rotor 100 is operable to rotate at a different (e.g., slower) rotational velocity than the power turbine rotating assembly 118 and its PT rotor 105. A ratio of a gear system within the first geartrain 124 may be configured to increase efficiency of the fan section 79 as well as the PT section 82C. The first geartrain 124 of FIG. 1 is located axially between (A) the engine core 94 and each of its engine sections 80A-82C and (B) the propulsor rotor 34 and the fan rotor 100.

The propulsor rotor 34 is connected to and rotatable with a propulsor shaft 126. At least (or only) the propulsor rotor 34 and the propulsor shaft 126 collectively form a propulsor rotating assembly 128. This propulsor rotating assembly 128 is rotatable about the axis 22. However, in other embodiments, the propulsor rotating assembly 128 may be rotatable about another axis laterally and/or angularly offset from the axis 22.

The propulsor rotating assembly 128 is coupled to the power turbine rotating assembly 118 through the first geartrain 124 and a second geartrain 130; e.g., a transmission, a speed change device, an epicyclic geartrain, etc. By contrast, the fan rotating assembly 122 of FIG. 1 is coupled to the power turbine rotating assembly 118 independent of the second geartrain 130; e.g., not through/by way of the second geartrain 130. The second geartrain 130 of FIG. 1, for example, is disposed axially between and operatively couples the propulsor rotating assembly 128 and its propulsor shaft 126 to the fan rotating assembly 122 and its fan shaft 120 and, thus, to the power turbine rotating assembly 118 and its power turbine shaft 116 through the first geartrain 124. Here, the fan shaft 120 is configured as an intermediate shaft/coupler between the first geartrain 124 and the second geartrain 130. With the foregoing arrangement, the propulsor rotor 34 is operable to rotate at a different (e.g., slower) rotational velocity than (A) the fan rotating assembly 122 and its fan rotor 100 as well as (B) the power turbine rotating assembly 118 and its PT rotor 105. A ratio of a gear system within the second geartrain 130 may be configured to increase efficiency of the propulsion module 28. The second geartrain 130 of FIG. 1 is located axially between (A) the fan section 79 and its fan rotor 100 and (B) the propulsor rotor 34. The fan section 79 of FIG. 1 and its fan rotor 100 are located axially between the first geartrain 124 and the second geartrain 130.

The inlet flowpath 86 fluidly couples an airflow inlet 132 into the turbine engine 30 from the external environment 38 to the core flowpath 88 and the bypass flowpath 90. The inlet flowpath 86 of FIG. 1, for example, extends longitudinally from the engine inlet 132, through the fan section 79, to an airflow inlet 134 into the core flowpath 88 and an airflow inlet 136 into the bypass flowpath 90. The engine inlet 132 of FIG. 1 is located at the engine forward end 58 and/or axially next to and downstream of the propulsor rotor 34.

The core flowpath 88 extends longitudinally, in an axial aft direction away from the propulsor rotor 34, through the engine core 94 from the inlet flowpath 86 to a combustion products core exhaust 138 from the core flowpath 88. The core flowpath 88 of FIG. 1, for example, extends sequentially through the LPC section 80A, the HPC section 80B, the combustor section 81, the HPT section 82A, the IPT section 82B and the PT section 82C from the core inlet 134 to the core exhaust 138. The core inlet 134 of FIG. 1 is located downstream of and may be longitudinally/axially next to the fan section 79 and its fan rotor 100. The core exhaust 138 of FIG. 1 is located downstream of and may be longitudinally/axially next to the PT section 82C and its PT rotor 105. The core inlet 134 and the core exhaust 138 may each be annular.

The bypass flowpath 90 extends longitudinally, in the axial aft direction away from the propulsor rotor 34, outside of the engine core 94 and its engine sections 80A-82C from the bypass inlet 136 to a bypass exhaust 140 from the bypass flowpath 90. The bypass flowpath 90 of FIG. 1, for example, is disposed radially outboard of and extends axially along (e.g., axially overlaps) the first geartrain 124 and the engine core 94 from the bypass inlet 136 to the bypass exhaust 140. The bypass inlet 136 of FIG. 1 is located downstream of and may be longitudinally/axially next to the fan section 79 and its fan rotor 100. This bypass inlet 136 is disposed radially outboard of and may circumscribe the core inlet 134. The bypass exhaust 140 may be located longitudinally/axially next to the PT section 82C and its PT rotor 105. This bypass exhaust 140 is disposed radially outboard of and may circumscribe the core exhaust 138. The bypass inlet 136 and the bypass exhaust 140 may be annular. Alternatively, the bypass flowpath 90 may start off as annular and then may converge into a single non-annular leg or split into multiple non-annular legs outside of and extending along the engine core 94. With such an arrangement, the bypass inlet 136 may be annular and each bypass exhaust 140 may be non-annular.

The exhaust flowpath 92 of FIG. 1 fluidly couples the core flowpath 88 and the bypass flowpath 90 to an exhaust 142 from the turbine engine 30 into the external environment 38. The exhaust flowpath 92 of FIG. 1, for example, extends longitudinally from the core exhaust 138 and/or the bypass exhaust 140 to the engine exhaust 142. The engine exhaust 142 of FIG. 1 is located at the propulsion system aft end 26.

With the foregoing arrangement, the core flowpath 88 and the bypass flowpath 90 are fluidly coupled in parallel between the inlet flowpath 86 and the exhaust flowpath 92. However, in other embodiments, it is contemplated the bypass flowpath 90 may alternatively be fluidly coupled to the external environment 38 independent of the exhaust flowpath 92. The bypass exhaust 140, for example, may alternatively be rerouted to adjoin the external environment 38.

During operation of the aircraft propulsion system 20, ambient air within the external environment 38 is propelled by the propulsor rotor 34 across the guide vane structure 36 in an aft, downstream direction towards the propulsion system aft end 26. A major outer portion of the air propelled by the propulsor rotor 34 flows across the guide vane structure 36 to provide forward thrust. The guide vane structure 36 and its guide vanes 62 condition (e.g., straighten out) the air propelled by the propulsor rotor 34, for example, to remove or reduce circumferential swirl. A minor inner portion of the air propelled by the propulsor rotor 34 flows into the turbine engine 30 and its inlet flowpath 86 through the engine inlet 132. The air within the inlet flowpath 86 is further propelled (e.g., compressed) by the fan rotor 100 and directed into the core flowpath 88 and the bypass flowpath 90. The air entering the core flowpath 88 may be referred to as "core air". The air entering the bypass flowpath 90 may be referred to as "bypass air".

The core air is compressed by the LPC rotor 101 and the HPC rotor 102 and directed into a combustion chamber 144 (e.g., an annular combustion chamber) of a combustor (e.g., an annular combustor) in the combustor section 81. Fuel is injected into the combustion chamber 144 and mixed with the compressed core air to provide a fuel-air mixture. This fuel-air mixture is ignited and combustion products thereof flow through and sequentially drive rotation of the HPT rotor 103, the IPT rotor 104 and the PT rotor 105 before being exhausted from the engine core 94 into the exhaust flowpath 92. The rotation of the HPT rotor 103 and the IPT rotor 104 respectively drive rotation of the HPC rotor 102 and the LPC rotor 101 and, thus, compression of the air received from the core inlet 134. The rotation of the PT rotor 105 drives rotation of the fan rotor 100 (through the first geartrain 124) and rotation of the propulsor rotor 34 (through the first geartrain 124 and the second geartrain 130). The rotation of the fan rotor 100 (A) propels the core air into the core flowpath 88 and (B) propels the bypass air through the bypass flowpath 90 into the exhaust flowpath 92. The exhaust flowpath 92 subsequently directs the bypass air along with the combustion products out of the aircraft propulsion system 20 and its turbine engine 30 into the external environment 38 through the engine exhaust 142. Concurrently, the rotation of the propulsor rotor 34 propels the ambient air within the external environment 38 across the guide vane structure 36 in the aft, downstream direction. With this arrangement, the turbine engine 30 and its engine core 94 power operation of (e.g., drive rotation of) the propulsor rotor 34 during aircraft propulsion system operation.

The heat exchange system 32 of FIG. 1 includes one or more heat exchangers 146. Each of these heat exchangers 146 may be arranged with (e.g., disposed in, project into, extend along, etc.) the bypass flowpath 90. Each heat exchanger 146 is configured to transfer heat energy between the bypass air directed through the bypass flowpath 90 and a working fluid. Examples of the working fluid include, but are not limited to, the core air, the combustion products, lubricant, fuel, coolant, or the like. With the foregoing arrangement, the heat exchangers 146 utilize the bypass air rather than, for example, ambient air scooped from the external environment 38, to enhance heat transfer efficiency. This may be particularly useful, for example, when the aircraft is operating on ground and air movement along the aircraft propulsion system 20 may be relatively slow and low pressure. By reducing or eliminating additional air scoop(s) along an exterior of the aircraft propulsion system 20, free stream drag along the exterior of the aircraft propulsion system 20 may also be reduced. In addition, by directing the bypass air into the exhaust flowpath 92 following use with the heat exchange system 32, remaining energy from the bypass air may be recuperated to supplement thrust generated by the combustion products exhausted through the engine exhaust 142 into the external environment 38.

In some embodiments, the bypass flowpath 90 may be configured with one or more sets of guide vanes (e.g., de-swirl vanes) disposed upstream and/or downstream of the heat exchangers 146.

In some embodiments, one of the geartrains 124, 130 may be a planetary geartrain and the other one of the geartrains 130, 124 may be a star geartrain. The first geartrain 124 of FIG. 4, for example, includes a star gear system. The second geartrain 130 of FIG. 4 includes a planetary gear system.

Figure 5:
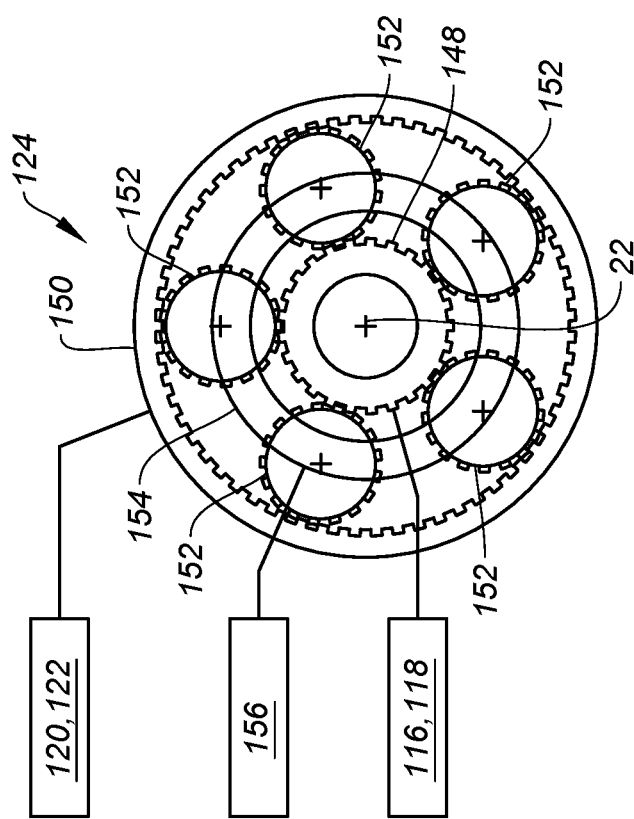
FIG. 5 is a schematic illustration of a first of the geartrains coupled with components of the propulsion system.

Referring to FIG. 5, the first geartrain 124 includes a first sun gear 148, a first ring gear 150, a plurality of first intermediate gears 152 (e.g., star gears) and a first carrier 154. The first sun gear 148 is rotatable about the axis 22. The first sun gear 148 is coupled to and rotatable with the power turbine rotating assembly 118 and its power turbine shaft 116. The first ring gear 150 circumscribes the first sun gear 148 and the first intermediate gears 152. The first ring gear 150 is rotatable about the axis 22. The first ring gear 150 is coupled to and rotatable with the fan rotating assembly 122 and its fan shaft 120; e.g., the intermediate shaft. The first intermediate gears 152 are arranged circumferentially about the axis 22 and the first sun gear 148 in an array. Each of the first intermediate gears 152 is disposed radially between and meshed with the first sun gear 148 and the first ring gear 150. Each of the first intermediate gears 152 is rotatably mounted to the first carrier 154. The first carrier 154 of FIG. 5 is fixedly connected to a stationary structure 156 of the aircraft propulsion system 20.

Figure 6:
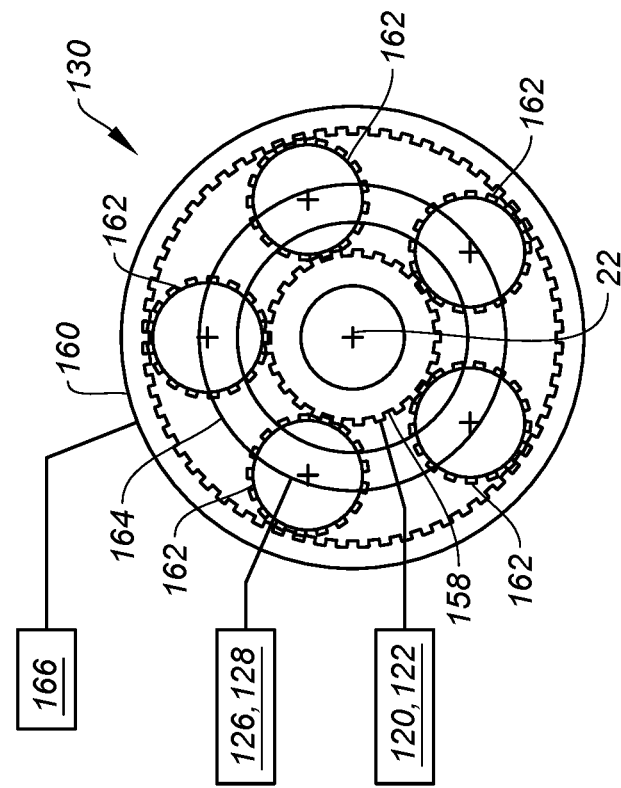
FIG. 6 is a schematic illustration of a second of the geartrains coupled with components of the propulsion system.

Referring to FIG. 6, the second geartrain 130 includes a second sun gear 158, a second ring gear 160, a plurality of second intermediate gears 162 (e.g., planet gears) and a second carrier 164. The second sun gear 158 is rotatable about the axis 22. The second sun gear 158 is coupled to and rotatable with the fan rotating assembly 122 and its fan shaft 120; e.g., the intermediate shaft. The second ring gear 160 circumscribes the second sun gear 158 and the second intermediate gears 162. The second ring gear 160 of FIG. 6 is fixedly connected to a stationary structure 166 of the aircraft propulsion system 20. The second intermediate gears 162 are arranged circumferentially about the axis 22 and the second sun gear 158 in an array. Each of the second intermediate gears 162 is disposed radially between and meshed with the second sun gear 158 and the second ring gear 160. Each of the second intermediate gears 162 is rotatably mounted to the second carrier 164. The second carrier 164 is rotatable about the axis 22. The second carrier 164 is coupled to and rotatable with the propulsor rotating assembly 128 and its propulsor shaft 126.

Figure 4:
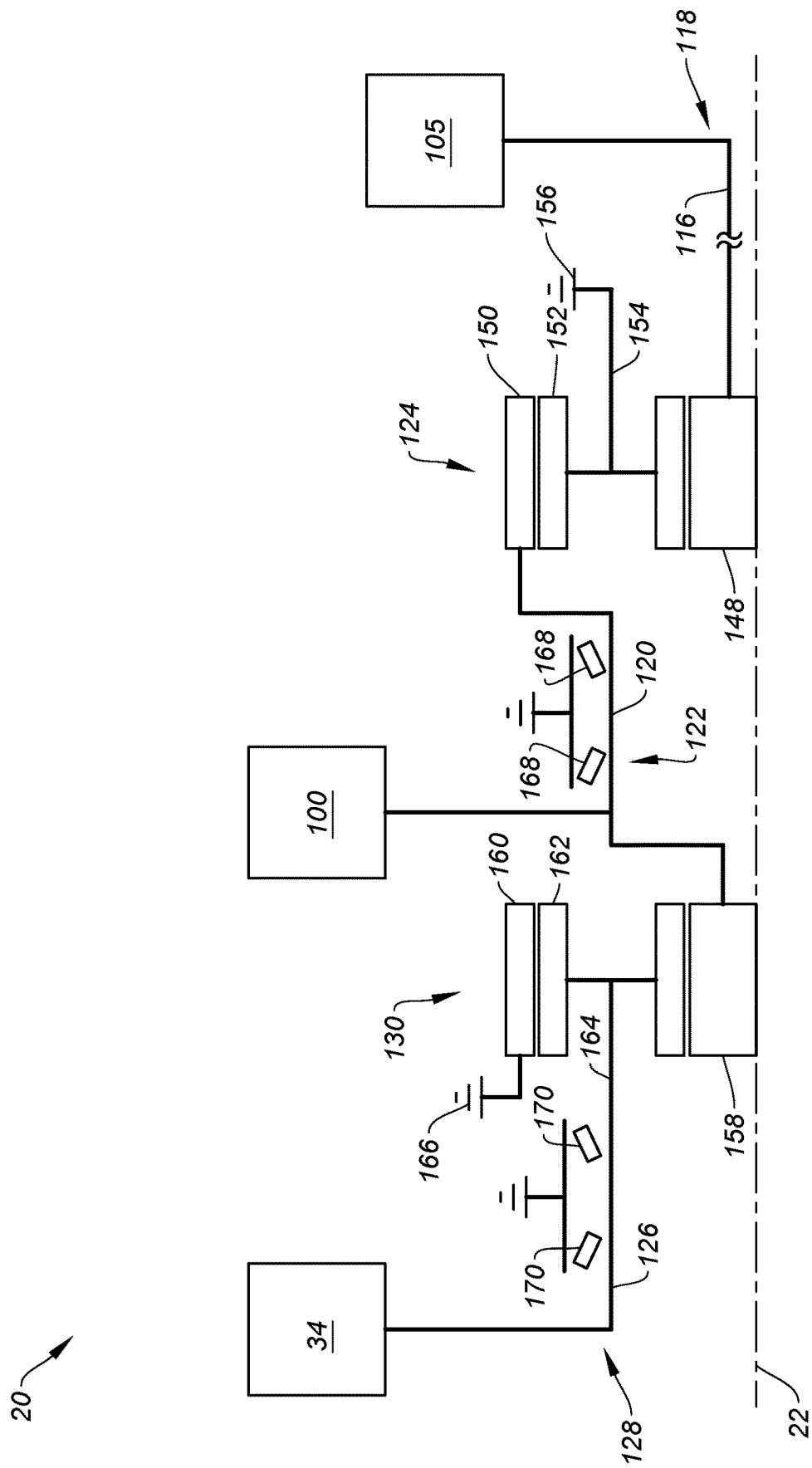
FIG. 4 is a partial schematic illustration of the propulsion system at a set of geartrains.

Referring to FIG. 4, the fan rotating assembly 122 and its fan shaft 120 may be rotatably supported by one or more bearings 168; e.g., thrust bearings. Similarly, the propulsor rotating assembly 128 and its propulsor shaft 126 may be rotatably supported by one or more bearings 170; e.g., thrust bearings.

Figure 7:
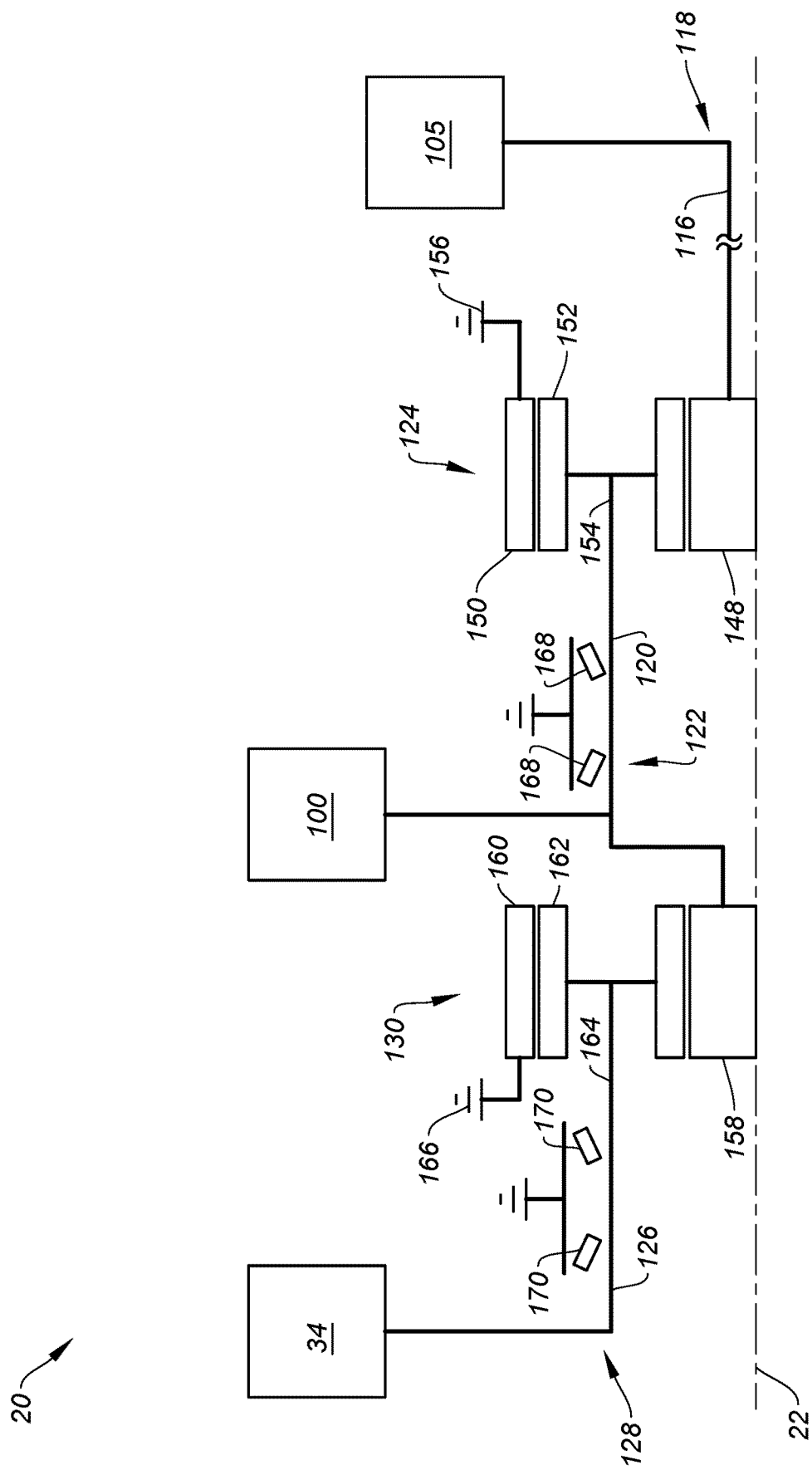
FIGS. 7 and 8 are partial schematic illustrations of the propulsion system with other arrangements of the geartrains.

In some embodiments, referring to FIG. 7, each of the geartrains 124 and 130 may be a planetary geartrain. The geartrains 124 and 130, for example, may be configured as described above with respect to FIGS. 4-6. However, whereas the first ring gear 150 of FIGS. 4-6 is rotatable and the first carrier 154 of FIGS. 4-6 is stationary, the first ring gear 150 of FIG. 7 is stationary and the first carrier 154 of FIG. 7 is rotatable. The first ring gear 150 of FIG. 7, for example, is fixedly connected to the stationary structure 156 of the aircraft propulsion system 20. The first carrier 154 is rotatable about the axis 22. Moreover, the first carrier 154 is coupled to and rotatable with the fan rotating assembly 122 and its fan shaft 120; e.g., the intermediate shaft.

Figure 8:
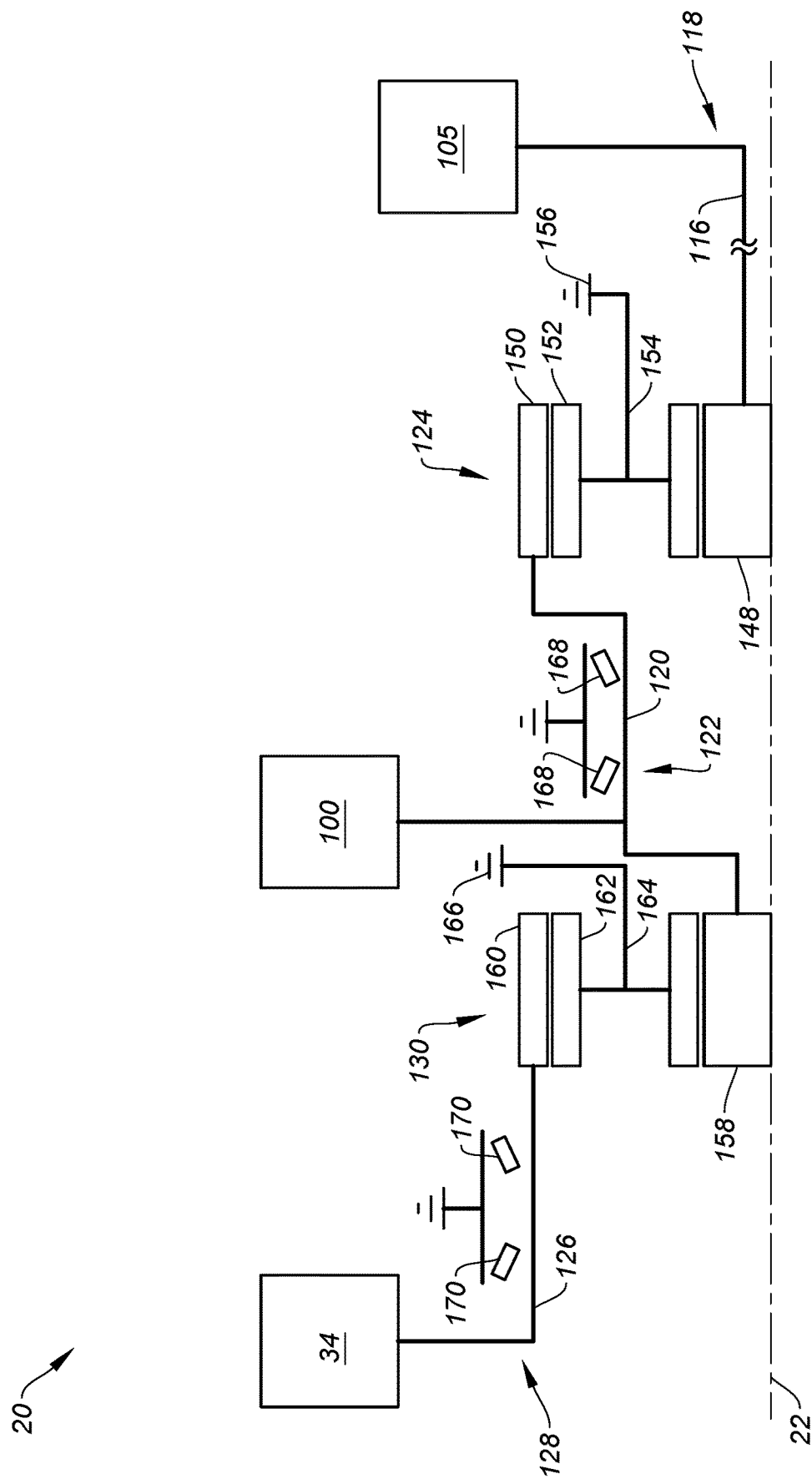

In some embodiments, referring to FIG. 8, each of the geartrains 124 and 130 may be a star geartrain. The geartrains 124 and 130, for example, may be configured as described above with respect to FIGS. 4-6. However, whereas the second ring gear 160 of FIGS. 4-6 is stationary and the second carrier 164 of FIGS. 4-6 is rotatable, the second ring gear 160 of FIG. 8 is rotatable and the second carrier 164 of FIG. 8 is stationary. The second carrier 164 of FIG. 8, for example, is fixedly connected to the stationary structure 166 of the aircraft propulsion system 20. The second ring gear 160 of FIG. 8 is rotatable about the axis 22. Moreover, the second ring gear 160 is coupled to and rotatable with the propulsor rotating assembly 128 and its propulsor shaft 126.

Figure 10:
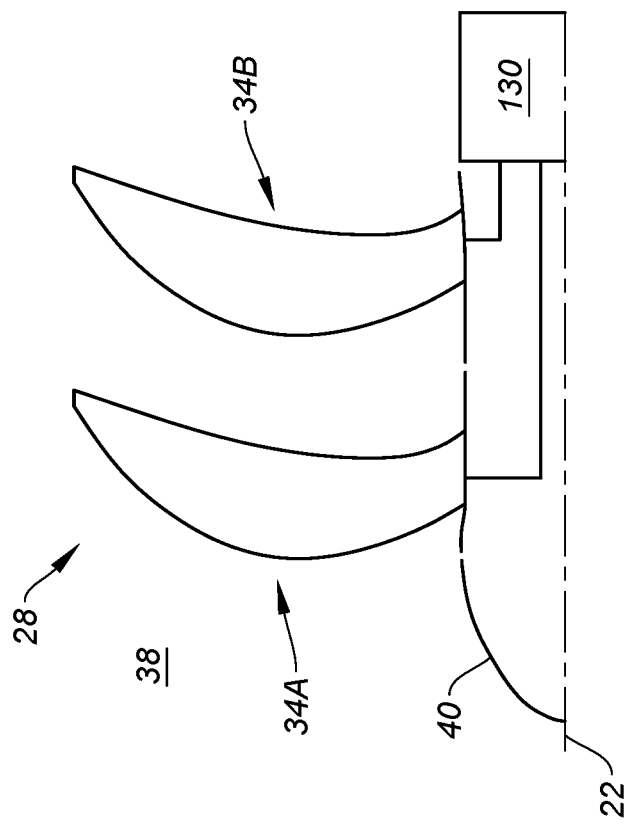
FIG. 10 is a partial schematic illustration of the propulsion system with a multi-rotor propulsion module.
Figure 9:
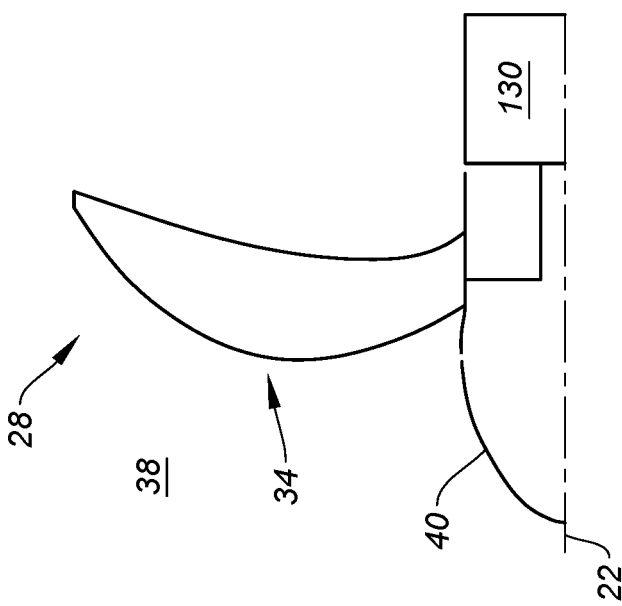
FIG. 9 is a partial schematic illustration of the propulsion system with a single rotor propulsion module.

The aircraft propulsion system 20 may have various propulsion module configurations other than the one described above. For example, referring to FIG. 9, the propulsion module 28 may be configured with the single propulsor rotor 34 and without a guide vane structure. In another example, referring to FIG. 10, the propulsion module 28 may be configured with multiple of the propulsor rotors 34A and 34B (generally referred to as "34") (e.g., counter-rotating open propulsor rotors). Each of these propulsor rotors 34 may be rotationally driven by the turbine engine 30 and its power turbine rotating assembly 118 through the geartrains 124 and 130 (see FIG. 1). In the dual propulsor rotor arrangement of FIG. 10, the propulsion module 28 is configured without a guide vane structure. The present disclosure therefore is not limited to the foregoing exemplary propulsor module configurations.

The aircraft propulsion system 20 of FIG. 1 is described above with a tractor configuration; e.g., where each propulsor rotor 34 is disposed at or otherwise near the propulsion system forward end 24. It is contemplated, however, the aircraft propulsion system 20 may be reversed to provide a pusher fan configuration. The present disclosure therefore is not limited to any particular open rotor propulsion system arrangement.

The aircraft propulsion system 20 of FIG. 1 is described above with three rotating assemblies within the turbine engine 30 and its engine core 94. It is contemplated, however, the turbine engine 30 and its engine core 94 may alternatively include more than three rotating assemblies or less than three rotating assemblies. For example, the turbine engine 30 and its engine core 94 may omit the PT section 82C and its associated rotor 105. In such embodiments, the turbine section 82B may be configured as a low pressure turbine section of the turbine engine 30 and its engine core 94. Here, the turbine rotor 104 may replace the turbine rotor 105, and the shaft 112 may be coupled to the first geartrain 124 rather than the shaft 116. Of course, various other arrangements are possible and contemplated.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A propulsion system for an aircraft, comprising:
an open propulsor rotor; and
a turbine engine including a fan section, an engine core, a first geartrain, a second geartrain, a core flowpath and a bypass flowpath;
the fan section comprising a fan rotor;
the engine core including a first rotating assembly, a low pressure compressor section, a high pressure compressor section, a combustor section, a high pressure turbine section and a low pressure turbine section, the low pressure compressor section is located axially between the first geartrain and the high pressure compressor section along the axis, and the first rotating assembly rotatable about an axis and configured to drive rotation of the open propulsor rotor and the fan rotor through the first geartrain;
the first geartrain located axially between the engine core and the open propulsor rotor, the first rotating assembly configured to drive the rotation of the fan rotor through the first geartrain and independent of the second geartrain;
the second geartrain located axially between the fan rotor and the open propulsor rotor;
the core flowpath extending through the low pressure compressor section, the high pressure compressor section, the combustor section, the high pressure turbine section and the low pressure turbine section from an inlet into the core flowpath to an exhaust from the core flowpath, and the inlet into the core flowpath next to and downstream of the fan section; and
the bypass flowpath extending outside of and along the engine core from an inlet into the bypass flowpath to an exhaust from the bypass flowpath, the exhaust from the bypass flowpath disposed radially outboard of and circumscribing the exhaust from the core flowpath, and the inlet into the bypass flowpath next to and downstream of the fan section.

2. The propulsion system of claim 1, wherein the first rotating assembly comprises a low pressure turbine rotor in the low pressure turbine section.

3. The propulsion system of claim 1, wherein the engine core further includes an intermediate pressure turbine section between the high pressure turbine section and the low pressure turbine section along the core flowpath.

4. The propulsion system of claim 3, wherein the intermediate pressure turbine section is configured to rotate independent of the first rotating assembly.

5. The propulsion system of claim 1, wherein
the low pressure turbine section comprises a low pressure turbine rotor; and
the first geartrain is located axially between the low pressure turbine rotor and the fan rotor.

6. The propulsion system of claim 1, wherein the first rotating assembly is configured to drive the rotation of the open propulsor rotor through the first geartrain and the second geartrain.

7. The propulsion system of claim 6, wherein
one of the first geartrain and the second geartrain comprises a planetary gear system; and
the other one of the first geartrain and the second geartrain comprises a star gear system.

8. The propulsion system of claim 6, wherein
the first geartrain comprises a planetary gear system; and
the second geartrain comprises a planetary gear system.

9. The propulsion system of claim 6, wherein
the first geartrain comprises a star gear system; and
the second geartrain comprises a star gear system.

10. The propulsion system of claim 6, wherein the fan rotor is located axially between the first geartrain and the second geartrain.

11. The propulsion system of claim 1, wherein at least a portion of the bypass flowpath is annular.

12. The propulsion system of claim 1, further comprising a heat exchanger disposed in the bypass flowpath.

13. The propulsion system of claim 1, wherein the turbine engine further includes an exhaust flowpath fluidly coupling the core flowpath and the bypass flowpath to an exhaust from the turbine engine.

14. The propulsion system of claim 1, further comprising an open guide vane structure downstream of the open propulsor rotor, the open guide vane structure configured to condition air propelled by the open propulsor rotor.

15. The propulsion system of claim 1, further comprising:
a second open propulsor rotor;
the first rotating assembly further configured to drive rotation of the second open propulsor rotor through the first geartrain.

16. A propulsion system for an aircraft, comprising:
a first gear system including a first sun gear, a first ring gear, a plurality of first intermediate gears and a first carrier, each of the plurality of first intermediate gears meshed with and radially between the first sun gear and the first ring gear, and each of the plurality of first intermediate gears rotatably mounted to the first carrier;
a second gear system including a second sun gear, a second ring gear, a plurality of second intermediate gears and a second carrier, each of the plurality of second intermediate gears meshed with and radially between the second sun gear and the second ring gear, each of the plurality of second intermediate gears rotatably mounted to the second carrier;
an intermediate shaft coupled to the first ring gear and the second sun gear;
a fan rotor coupled to the intermediate shaft, the fan rotor located axially between the first gear system and the second gear system;
an open propulsor rotor coupled to the second carrier; and
an engine core comprising a rotating assembly of a turbine engine, the rotating assembly coupled to the first sun gear, the rotating assembly configured to drive rotation of the fan rotor through the first gear system and independent of the second gear system, and the rotating assembly configured to drive rotation of the open propulsor rotor through the first gear system and the second gear system;
wherein the first gear system is arranged between the engine core and the fan rotor.

17. A propulsion system for an aircraft, comprising:
a plurality of gear systems, each of the plurality of gear systems comprising a planetary gear system or a star gear system;
an intermediate shaft operatively coupling a first of the plurality of gear systems to a second of the plurality of gear systems;
a fan rotor coupled to the intermediate shaft;
an open propulsor rotor operatively coupled to the second of the plurality of gear systems; and
an engine core comprising a rotating assembly of a turbine engine, the rotating assembly operatively coupled to the first of the plurality of gear systems, the rotating assembly configured to drive rotation of the fan rotor through the first of the plurality of gear systems and independent of the second of the plurality of gear systems, and the rotating assembly configured to drive rotation of the open propulsor rotor through the first of the plurality of gear systems and the second of the plurality of gear systems;
wherein the first of the plurality of gear system is located axially between the engine core and the fan rotor.

* * * * *